United States Patent
Yamaguchi et al.

(10) Patent No.: US 10,040,923 B2
(45) Date of Patent: Aug. 7, 2018

(54) ROOM-TEMPERATURE-CURABLE ORGANOPOLYSILOXANE COMPOSITION, AND MOULDED PRODUCT COMPRISING CURED PRODUCT OF SAID ROOM-TEMPERATURE-CURABLE ORGANOPOLYSILOXANE COMPOSITION

(71) Applicant: Shin-Etsu Chemical Co., Ltd., Tokyo (JP)

(72) Inventors: Takahiro Yamaguchi, Annaka (JP); Takafumi Sakamoto, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 32 days.

(21) Appl. No.: 15/318,994

(22) PCT Filed: May 27, 2015

(86) PCT No.: PCT/JP2015/065317
§ 371 (c)(1),
(2) Date: Dec. 15, 2016

(87) PCT Pub. No.: WO2015/194340
PCT Pub. Date: Dec. 23, 2015

(65) Prior Publication Data
US 2017/0130031 A1    May 11, 2017

(30) Foreign Application Priority Data

Jun. 16, 2014 (JP) ................. 2014-123070

(51) Int. Cl.
| | |
|---|---|
| C08K 5/5425 | (2006.01) |
| C08G 77/38 | (2006.01) |
| C08L 83/04 | (2006.01) |
| C09D 183/04 | (2006.01) |
| C09J 183/04 | (2006.01) |

(52) U.S. Cl.
CPC ............ C08K 5/5425 (2013.01); C08G 77/38 (2013.01); C08L 83/04 (2013.01); C09D 183/04 (2013.01); C09J 183/04 (2013.01); C08L 2205/025 (2013.01)

(58) Field of Classification Search
CPC .............................. C08G 77/16; C08K 5/5425
See application file for complete search history.

(56) References Cited

U.S. PATENT DOCUMENTS

| | | | |
|---|---|---|---|
| 2015/0315428 A1 | 11/2015 | Sakamoto et al. | |
| 2015/0315438 A1 | 11/2015 | Sakamoto et al. | |
| 2016/0083524 A1 | 3/2016 | Katayama et al. | |

FOREIGN PATENT DOCUMENTS

| | | |
|---|---|---|
| EP | 3 085 739 A1 | 10/2016 |
| JP | 39-27643 | 12/1939 |
| JP | 54-88225 A | 7/1979 |
| JP | 55-43119 A | 3/1980 |
| JP | 7-39547 B2 | 5/1995 |
| JP | 7-331076 A | 12/1995 |
| WO | 2014/097573 A1 | 6/2014 |
| WO | 2014/097574 A1 | 6/2014 |
| WO | 2014/185276 A1 | 11/2014 |
| WO | 2015/093139 A1 | 6/2015 |

OTHER PUBLICATIONS

Voronkov (Izevtiya Akademii Nauk SSSR, Seriya Khimicheskaya (1974) (9) 2066-70)(Abstract).*
Voronkov (Izevtiya Akademii Nauk SSSR, Seriya Khimicheskaya (1974) (9) 2066-70).*
International Search Report dated Aug. 25, 2015 in PCT/JP2015/065317 filed May 27, 2015.
Voronkov, M.G. et al., "Derivatives of methyl substituted trans-1,2-disilylethylene", Izvestiya Akademii Nauk SSSR, Seriya Khimicheskaya, 1974, No. 9, 6 pages.
Voronkov, M.G. et al., "Synthesis of new derivatives of trans-1,2-disilylethylene by hydrosilylation of ethynylsilanes", Izvestiya Akademii Nauk SSSR, Seriya Khimicheskaya, 1976, No. 8, 5 pages.
Extended European Search Report dated Jan. 4, 2018 in Patent Application No. 15809931.7, citing document AO therein, 5 pages.

* cited by examiner

*Primary Examiner* — Kuo Liang Peng
(74) *Attorney, Agent, or Firm* — Oblon, McClelland, Maier & Neustadt, L.L.P.

(57) ABSTRACT

This room-temperature-curable organopolysiloxane composition includes: component (A); 0.1-30 parts by mass of component (B) per 100 parts by mass of component (A); and 0.001-20 parts by mass of component (D) per 100 parts by mass of component (A). Component (A) is an organopolysiloxane represented by general formula (1) (in general formula (1): $R^1$ represents hydrogen, or a substituted or unsubstituted C1-20 monovalent hydrocarbon group; the plurality of $R^1$s may be the same or different; and n represents an integer of at least 1). Component (B) is an organic silicon compound which is represented by general formula (2), and which is characterized by having two silyl-vinylene groups provided to the same silicon atom (in general formula (2): $R^1$ represents hydrogen, or a substituted or unsubstituted C1-20 monovalent hydrocarbon group; the plurality of $R^1$s may be the same or different; $R^2$ represents a substituted or unsubstituted C1-20 alkyl group, or a substituted or unsubstituted C3-20 cycloalkyl group; and a represents an integer from 1 to 3). Component (D) is a curing catalyst.

7 Claims, No Drawings

ROOM-TEMPERATURE-CURABLE ORGANOPOLYSILOXANE COMPOSITION, AND MOULDED PRODUCT COMPRISING CURED PRODUCT OF SAID ROOM-TEMPERATURE-CURABLE ORGANOPOLYSILOXANE COMPOSITION

TECHNICAL FIELD

The present invention relates to a room-temperature-curable organopolysiloxane composition and an elastomeric moulded product (a cured silicone rubber product) obtained by curing the room-temperature-curable organopolysiloxane. Specifically, the present invention relates to a room-temperature-curable organopolysiloxane composition comprising, as a curing agent (a crosslinking agent), an organic silicon compound having, within the molecule, a hydrolyzable silyl group and a structure of 2 silicon atoms crosslinked by a carbon-carbon double bond, and a moulded product obtained by curing the room-temperature-curable organopolysiloxane composition.

BACKGROUND ART

Conventionally, various types of room-temperature-curable organopolysiloxane compositions have been known which, upon coming into contact with moisture in the air, crosslinks to each other by condensation reaction and cures to give an elastomer (silicone rubber) at room temperature. Among these compositions, dealcoholization-type organopolysiloxane compositions, which generate alcohol upon crosslinking to each other by condensation reaction and curing, do not generate unpleasant odor or cause metal corrosion and therefore have been suitably used in sealing, adhesive, and coating applications in electrical and electronic devices and the like.

Typical examples of the dealcoholization-type organopolysiloxane compositions include a composition composed of a polyorganosiloxane end-capped with a hydroxyl group, an alkoxysilane, and an organic titanium compound; a composition composed of a polyorganosiloxane end-capped with an alkoxysilyl group, an alkoxysilane, and an alkoxy titanium; a composition composed of a linear polyorganosiloxane the terminal of which has been blocked by an alkoxysilyl group containing a silethylene group, an alkoxysilane, and an alkoxy titanium; and a composition composed of a polyorganosiloxane end-capped with a hydroxyl group or a polyorganosiloxane end-capped with an alkoxy group and an alkoxy-α-silyl ester compound (Patent Literatures 1 to 4).

These compositions have storage stability, water resistance, and humidity resistance to some extent, but do not fully satisfy the requirements for these properties. Nor do these compositions fully satisfy the requirements for rapid curability.

As described above, organosiloxane polymers having a reactive (hydrolyzable) alkoxysilyl group at its end have been conventionally known. Because being end-capped with an alkoxysilyl group, these polymers are unlikely to have their curability subjected to changes (degradation) with time and therefore have excellent storage stability. In addition, these polymers have their workability (viscosity, thixotropy) optionally controllable, crosslink to each other upon reaction with moisture in the air and give an elastomer, and have excellent properties (hardness, tensile strength, elongation at break).

However, the dealcoholization-type organopolysiloxane compositions, compared to conventionally known other types of organosiloxane compositions such as deoximation type, deacetic acid type, and deacetonation type organosiloxane compositions, are low in reactivity with moisture in the air and therefore are insufficient in curability.

In the circumstances, there have been developed room-temperature-curable organopolysiloxane compositions that are excellent in rapid curability and can give a cured product that is excellent in humidity resistance (curability after storage under anti-humidity conditions). However, none of such compositions can be advantageously produced on an industrial scale.

CITATION LIST

Patent Literatures

Patent Literature 1: JP S39-27643 B
Patent Literature 2: JP S55-43119 A
Patent Literature 3: JP H07-39547 B
Patent Literature 4: JP H07-331076 A

SUMMARY OF INVENTION

Technical Problems

The present invention has been devised based on the above circumstances, and an object of the present invention is to provide a room-temperature-curable organopolysiloxane composition, in particular, a dealcoholization-type room-temperature-curable organopolysiloxane composition, that is especially excellent in rapid curability, gives a cured product excellent in storage stability and durability, and can be advantageously produced on an industrial scale by using a versatile material.

Solution to Problems

The present inventors have conducted intensive research to achieve the object described above and, as a result, have found that the hydrolyzability of the alkoxy group in an alkoxysilyl group (including an unsubstituted or substituted alkoxysilyl group and an unsubstituted or substituted cycloalkoxysilyl group) is remarkably enhanced only when the alkoxysilyl group is adjacent to and bonded to a vinylene group (namely, an ethenylene group). They have also found that by using a hydrolyzable organic silicon compound represented by the general formula (2) below such as an organosilane having 2 alkoxysilyl-vinylene groups (alkoxysilyl-ethenylene groups) per molecule as a crosslinking agent (a curing agent), a dealcoholization-type room-temperature-curable organopolysiloxane composition is obtained that is especially excellent in rapid curability and that gives a cured product excellent in storage stability and durability. They have further found that the room-temperature-curable organopolysiloxane composition can be advantageously produced on an industrial scale by using a versatile material (a diorganodichlorosilane, for example) as part of the starting material of the compound having alkoxysilyl-vinylene groups (alkoxysilyl-ethenylene groups).

In other words, <1> the present invention provides a room-temperature-curable organopolysiloxane composition comprising components (A), (B), and (D) below:

(A) an organopolysiloxane represented by the general formula (1) below:

[Chemical Formula 1]

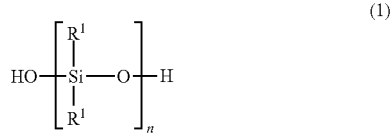

(1)

wherein $R^1$ is a hydrogen atom or an unsubstituted or substituted monovalent hydrocarbon group having 1 to 20 carbon atoms, a plurality of $R^1$ may be the same as or different from each other, and n is an integer of 1 or greater;

(B) an organic silicon compound represented by the general formula (2) below containing 2 alkoxysilyl-vinylene groups (alkoxysilyl-ethenylene groups) on a single silicon atom, an amount of the component (B) being from 0.1 to 30 parts by mass based on 100 parts by mass of the component (A):

[Chemical Formula 2]

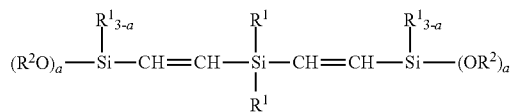

(2)

wherein $R^1$ is a hydrogen atom or an unsubstituted or substituted monovalent hydrocarbon group having 1 to 20 carbon atoms, a plurality of $R^1$ may be the same as or different from each other, $R^2$ is an unsubstituted or substituted alkyl group having 1 to 20 carbon atoms or an unsubstituted or substituted cycloalkyl group having 3 to 20 carbon atoms, and a is an integer of 1 to 3; and (D) a curing catalyst, an amount of the component (D) being from 0.001 to 20 parts by mass based on 100 parts by mass of the component (A).

<2> The present invention provides the room-temperature-curable organopolysiloxane composition according to <1>, further comprising (C) a hydrolyzable silane and/or a partial hydrolysis-condensation product thereof except for the component (B), an amount of the component (C) being from 0.1 to 30 parts by mass based on 100 parts by mass of the component (A).

<3> The present invention provides the room-temperature-curable organopolysiloxane composition according to <1> or <2>, further comprising (E) a filler, an amount of the component (E) being from 0.1 to 1000 parts by mass based on 100 parts by mass of the component (A).

<4> The present invention provides the room-temperature-curable organopolysiloxane composition according to any one of <1> to <3>, further comprising (F) an adhesion promoter, an amount of the component (F) being from 0.1 to 30 parts by mass based on 100 parts by mass of the component (A).

<5> The present invention provides the room-temperature-curable organopolysiloxane composition according to any one of <1> to <4>, further comprising (G) an organopolysiloxane represented by the formula (3), an amount of the component (G) being from 0.1 to 100 parts by mass based on 100 parts by mass of the component (A):

[Chemical Formula 3]

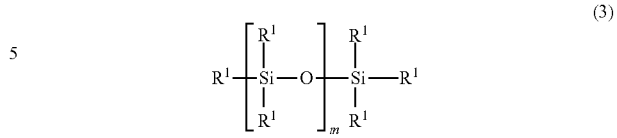

(3)

wherein $R^1$ is a hydrogen atom or an unsubstituted or substituted monovalent hydrocarbon group having 1 to 20 carbon atoms, a plurality of $R^1$ may be the same as or different from each other, and m is an integer of 1 to 2000.

<6> The present invention provides a sealing agent, a coating agent, and an adhesive agent, which comprising the room-temperature-curable organopolysiloxane composition according to <1>.

<7> The present invention provides a moulded product comprising a cured product of the room-temperature-curable organopolysiloxane composition according to <1>.

Advantageous Effects of Invention

The room-temperature-curable organopolysiloxane composition of the present invention is especially excellent in rapid curability in the air at room temperature and even after stored for 6 months, for example, it still rapidly cures upon exposure to the air and gives excellent physical properties. Therefore, the room-temperature-curable organopolysiloxane composition of the present invention is useful as a sealing agent, a coating agent, or an adhesive agent to be applied to a site where heat resistance, water resistance, or humidity resistance is required, and can be effectively used particularly where steam resistance or water resistance is required, such as in building applications and in applications as an adhesive agent for electrical and electronic uses. Because the room-temperature-curable organopolysiloxane composition comprises a silicon compound represented by the general formula (2) having 2 alkoxysilyl-vinylene groups (alkoxysilyl-ethenylene groups) on a single silicon atom as the curing agent component (B), the room-temperature-curable organopolysiloxane composition of the present invention is especially excellent in rapid curability and can give a cured product that is excellent in storage stability and durability. Furthermore, the room-temperature-curable organopolysiloxane composition of the present invention can be advantageously produced on an industrial scale by using a versatile chlorosilane (a diorganodichlorosilane, for example) as a starting material of the component (B).

MODE FOR CARRYING OUT INVENTION

The present invention will be described below in detail.
<Room-Temperature-Curable Organopolysiloxane Composition>
—Component (A)—

A component (A) is a linear organopolysiloxane represented by the general formula (1) in which each end of the molecular chain is capped with a hydroxyl group that is bonded to a silicon atom (namely, a silanol group or a diorganohydroxysiloxy group). The component (A) functions as the main component (the base polymer) of the composition of the present invention.

[Chemical Formula 4]

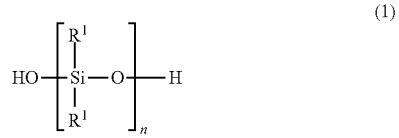

wherein $R^1$ is a hydrogen atom or an unsubstituted or substituted monovalent hydrocarbon group having 1 to 20 carbon atoms, a plurality of $R^1$ may be the same as or different from each other, and n is an integer of 1 or greater.

The substituted or unsubstituted monovalent hydrocarbon group as $R^1$ in the general formula (1) above has about 1 to 20 carbon atoms, preferably about 1 to 10 carbon atoms, and more preferably about 1 to 8 carbon atoms and may be the same as or different from each other. Specific examples thereof can include alkyl groups such as methyl group, ethyl group, n-propyl group, isopropyl group, n-butyl group, isobutyl group, tert-butyl group, pentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and eicosyl group; cycloalkyl groups such as cyclopentyl group and cyclohexyl group; alkenyl groups such as vinyl group, allyl group, propenyl group, isopropenyl group, butenyl group, pentenyl group, and hexenyl group; aryl groups such as phenyl group, tolyl group, xylyl group, and α-, β-naphthyl group; aralkyl groups such as benzyl group, 2-phenylethyl group, and 3-phenylpropyl group; and groups in which part or all of the hydrogen atoms in the group is substituted with a halogen atom such as F, Cl, or Br or with a group such as cyano group, including 3-chloropropyl group, 3,3,3-trifluoropropyl group, and 2-cyanoethyl group. Among these, methyl group, ethyl group, and phenyl group are preferable, and in terms of availability, productivity, and cost, methyl group and phenyl group are particularly preferable.

The viscosity of the organopolysiloxane as the component (A) at 25° C. is preferably from 10 to 1,000,000 mPa·s, more preferably from 50 to 500,000 mPa·s, particularly preferably from 100 to 100,000 mPa·s, and further preferably from 500 to 80,000 mPa·s. The viscosity of the organopolysiloxane is preferably not lower than 10 mPa·s so as to readily obtain a coating that has excellent physical and mechanical strength, and the viscosity of the organopolysiloxane is preferably not higher than 1,000,000 mPa·s so as to prevent the viscosity of the resulting composition from being too high and to give excellent workability during use. The viscosity is a numerical value measured with a rotational viscometer (BL-type, BH-type, BS-type, or Cone/Plate-type, for example; the same shall apply hereinafter).

To make the viscosity of the organopolysiloxane as the component (A) fall within the range described above, n in the general formula (1) above (the number of, or the degree of polymerization of, difunctional diorganosiloxane units in the molecule) is usually from about 10 to 2,000, preferably from about 30 to 1,500, more preferably from about 50 to 1,200, and further preferably from about 100 to 1,000. The degree of polymerization (or the molecular weight) is determined, for example, as a number average degree of polymerization (or a number average molecular weight) in terms of polystyrene measured by gel permeation chromatography (GPC) analysis in which toluene or the like is used as the developing solvent. The organopolysiloxane as the component (A) can be used alone or as a combination of two or more of these.

The content of the organopolysiloxane as the component (A) in the room-temperature-curable organopolysiloxane composition of the present invention is preferably 99 to 20% by mass and particularly preferably 95 to 50% by mass.

—Component (B)—

A component (B) is a hydrolyzable organic silicon compound represented by the general formula (2) having 2 alkoxysilyl-vinylene groups (alkoxysilyl-ethenylene groups) on a single silicon atom. The component (B) functions as a curing agent (a crosslinking agent) in the composition of the present invention. The component (B) contributes to rapid curability of the composition and gives a cured product (silicone rubber) that is excellent in humidity resistance.

[Chemical Formula 5]

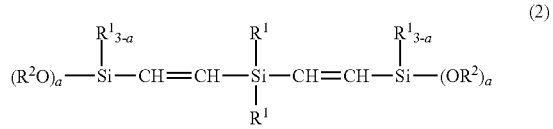

wherein $R^1$ is a hydrogen atom or an unsubstituted or substituted monovalent hydrocarbon group having 1 to 20 carbon atoms, a plurality of $R^1$ may be the same as or different from each other, $R^2$ is an unsubstituted or substituted alkyl group having 1 to 20 carbon atoms or an unsubstituted or substituted cycloalkyl group having 3 to 20 carbon atoms, and a is an integer of 1 to 3.

The substituted or unsubstituted monovalent hydrocarbon group as $R^1$ in the general formula (2) above has about 1 to 20 carbon atoms, preferably about 1 to 10 carbon atoms, and more preferably about 1 to 8 carbon atoms and may be the same as or different from each other. Specific examples thereof can include alkyl groups such as methyl group, ethyl group, n-propyl group, isopropyl group, n-butyl group, isobutyl group, tert-butyl group, pentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and eicosyl group; cycloalkyl groups such as cyclopentyl group and cyclohexyl group; alkenyl groups such as vinyl group, allyl group, propenyl group, isopropenyl group, butenyl group, pentenyl group, and hexenyl group; aryl groups such as phenyl group, tolyl group, xylyl group, and α-, β-naphthyl group; aralkyl groups such as benzyl group, 2-phenylethyl group, and 3-phenylpropyl group; and groups in which part or all of the hydrogen atoms in the group is substituted with a halogen atom such as F, Cl, or Br or with a group such as cyano group, including 3-chloropropyl group, 3,3,3-trifluoropropyl group, and 2-cyanoethyl group. Among these, methyl group, ethyl group, and phenyl group are preferable, and in terms of availability, productivity, and cost, methyl group and phenyl group are particularly preferable.

The unsubstituted or substituted alkyl group as $R^2$ has about 1 to 20 carbon atoms, preferably about 1 to 6 carbon atoms, and more preferably about 1 to 4 carbon atoms. Specific examples thereof include methyl group, ethyl group, n-propyl group, isopropyl group, n-butyl group, isobutyl group, tert-butyl group, pentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and eicosyl group. The unsubstituted or substituted cycloalkyl group has about 3 to 20 carbon atoms, preferably about 4 to 8 carbon atoms, and more preferably about 5 to 6 carbon atoms. Specific examples thereof include cyclopentyl group and cyclohexyl group. In these alkyl groups and cycloalkyl groups, part or all of the hydrogen atoms in the group may be substituted with a halogen atom such as F, Cl, or Br or with a group such as cyano group, and examples of such substituted groups include halogen-substituted alkyl groups such as 3-chloropropyl group and 3,3,3-trifluoropropyl group as well as 2-cyanoethyl group. Among all of these examples, $R^2$ is preferably methyl group or ethyl group and particularly preferably methyl group in terms of hydrolyzability and the like.

The hydrolyzable organic silicon compound represented by the general formula (2) as the component (B) is used primarily as a curing agent (a crosslinking agent). Each a in the general formula (2) is independently an integer of 1 to 3 and in terms of curability, it is preferably 2 or 3. In particular, a hydrolyzable organic silicon compound having 3 alkoxy groups, such as 3 methoxy groups, on a single silicon atom of the molecule (namely, 6 of such groups in total within the molecule) means that the hydrolyzable organic silicon compound has 2 trifunctional alkoxysilane moieties per molecule. Such a hydrolyzable organic silicon compound is useful as a curing agent (crosslinking agent) for use in dealcoholization-type silicone RTV (room-temperature-curable organopolysiloxane compositions). An example of the procedure to synthesize the component (B) will be described below.

<Production of Silicon-Containing Compound Having 2 Alkoxysilyl-Vinylene Groups on Single Silicon Atom>

The silicon-containing compound having 2 alkoxysilyl-vinylene groups (alkoxysilyl-ethenylene groups) on a single silicon atom as the component (B) can be easily produced by, for example, addition reaction, namely, hydrosilylation reaction of a silane having 2 ethynyl groups on a single silicon atom with 2 alkoxyhydrosilanes. This reaction is represented by the reaction formula [1] below, for example.

[Chemical Formula 6]

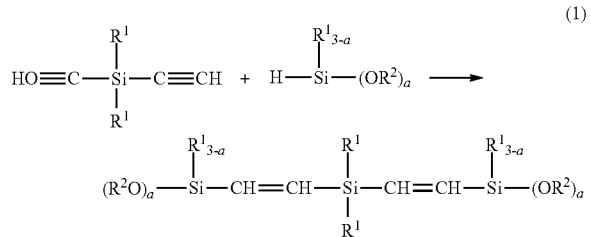

wherein $R^1$, $R^2$, and a are the same as those defined for the general formula (2) above.

The catalyst for use in the addition reaction for adding alkoxyhydrosilanes may be a catalyst based on a metal of the platinum group, such as a platinum-based catalyst, a palladium-based catalyst, a rhodium-based catalyst, or a ruthenium-based catalyst, among which a platinum-based catalyst is particularly preferable. Examples of the platinum-based catalyst include platinum black, ones composed of solid platinum supported on a carrier such as alumina or silica, chloroplatinate, alcohol-denatured chloroplatinate, complexes of chloroplatinate and an olefin, and complexes of platinum and vinylsiloxane. The amount of platinum used in the catalyst may be a so-called catalytic amount, and when the catalyst is used for alkoxyhydrosilanes, for example, the mass of platinum can be from 0.1 to 1,000 ppm and, in particular, from 0.5 to 100 ppm in terms of a metal of the platinum group.

It is desirable to conduct this reaction at a temperature generally from 50 to 120° C. and particularly from 60 to 100° C. for 0.5 to 12 hours and particularly for 1 to 6 hours. This reaction can be conducted without using a solvent, but alternatively, an appropriate solvent such as toluene or xylene can be used, if necessary, as long as no adverse influence is exerted on the addition reaction or the like.

The addition reaction between an alkoxyhydrosilane and an ethynyl group generates a geometric isomer shown in the reaction formula [2] below, for example. In the silicon-containing compound of the present invention, not only an isomer E (trans form) can be used which is generated highly selectively and is highly reactive, but also an isomer Z (cis form) can be used because it does not adversely influence the properties of the silicon-containing compound of the present invention. Therefore, it is not necessary to isolate one of these isomers from another.

[Chemical Formula 7]

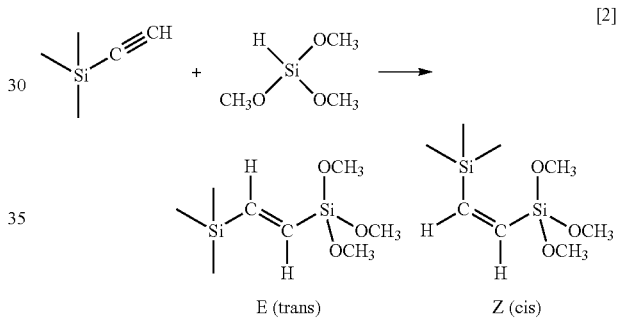

Specific examples of the organic silicon compound of the general formula (2) having 2 alkoxysilyl-vinylene groups on a single silicon atom include ones represented by the following structural formulae. These compounds can be used alone or as a combination of two or more of these as the component (B) of the present invention.

[Chemical Formula 8]

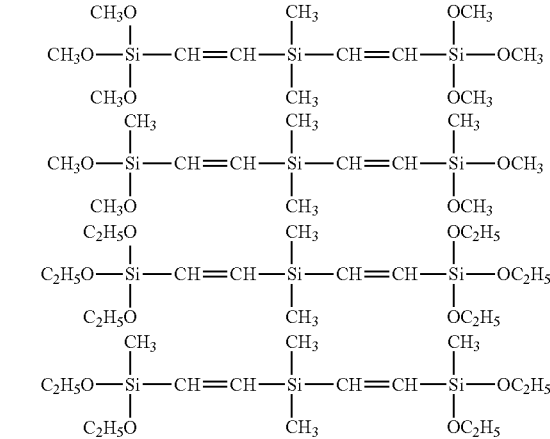

-continued

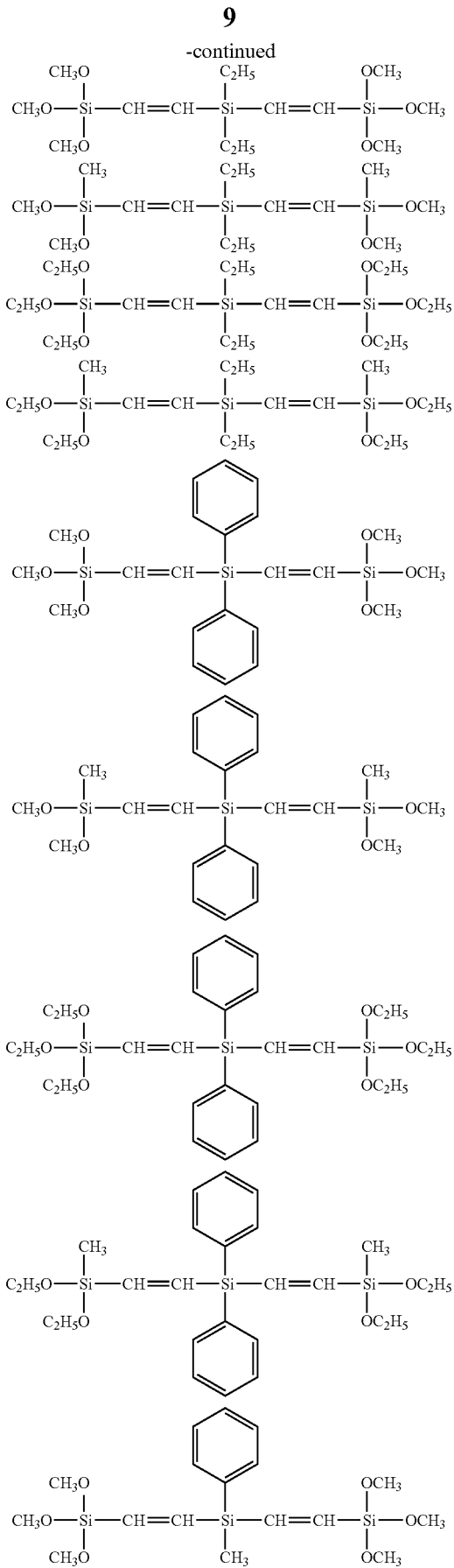

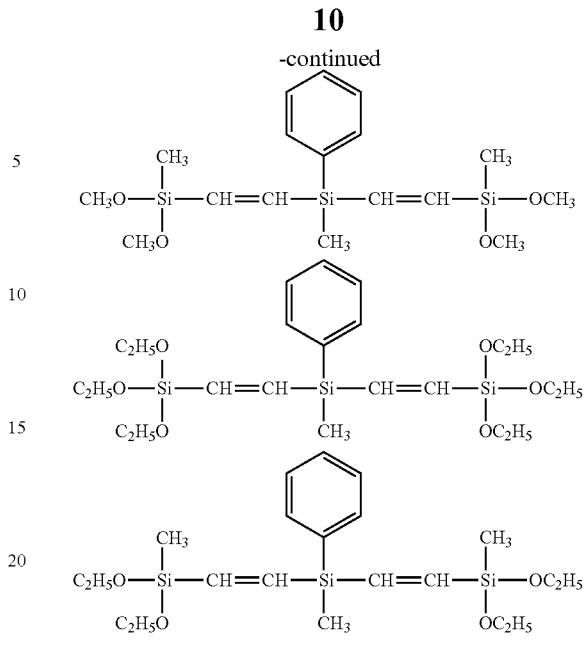

The amount of the hydrolyzable organic silicon compound as the component (B) is from 0.1 to 30 parts by mass, preferably from 0.5 to 20 parts by mass, and more preferably from 3 to 15 parts by mass based on 100 parts by mass of the component (A). If the amount is smaller than 0.1 parts by mass, an adequate level of crosslinks may not be formed and, as a result, the resulting composition may not have the intended level of rapid curability. If the amount is greater than 30 parts by mass, the mechanical properties such as rubber-like properties may be poor. Either case may be economically disadvantageous.

—Component (C)—

A component (C) is a hydrolyzable silane and/or a partial hydrolysis-condensation product thereof except for the component (B) and is a crosslinking agent. The component (C) is an optional component added as needed. Specific examples of the component (C) include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, phenyltripropenoxysilane, and partial hydrolysis-condensation products thereof. These can be used alone or as a combination of two or more of these.

The amount of the component (C) is usually from 0 to 30 parts by mass, preferably from 0.1 to 20 parts by mass, and more preferably from 0.5 to 15 parts by mass based on 100 parts by mass of the component (A). If the amount is greater than 30 parts by mass, the resulting cured product may be too hard, which is economically disadvantageous.

—Component (D)—

A component (D) is a curing catalyst and is used to facilitate the hydrolysis-condensation reaction between the composition of the present invention and moisture in the air. The curing catalyst as the component (D) is a common curing catalyst. The component (D) can be a known curing catalyst that is typically contained in a room-temperature-curable silicone rubber composition that cures in the presence of moisture.

Examples of the curing catalyst as the component (D) include, but are not limited to, organic metal compounds, for example, alkyltin ester compounds such as dibutyltin diacetate, dibutyltin dilaurate, and dibutyltin dioctoate, titanic acid esters or titanium chelate compounds such as tetraisopropoxytitanium, tetra n-butoxytitanium, tetrakis(2-ethylhexoxy)titanium, dipropoxybis(acetylacetonato)titanium, and titanium isopropoxyoctylene glycol, zinc naphthenate, zinc stearate, zinc-2-ethyloctoate, iron-2-ethylhexoate, cobalt-2-ethylhexoate, manganese-2-ethylhexoate, cobalt naphthenate, alcoholate aluminum compounds such as aluminum isopropylate and aluminum secondary butyrate, aluminum chelate compounds such as aluminum alkyl acetate-diisopropylate and aluminum bisethylacetoacetate-monoacetylacetonate, bismuth (III) neodecanoate, bismuth (III) 2-ethylhexanoate, bismuth (III) citrate, and bismuth octylate; phosphazene-containing compounds such as N,N, N',N',N'',N''-hexamethyl-N'''-(trimethylsilylmethyl)-phosphoramidic triamide, aminoalkyl group-substituted alkoxysilane such as 3-aminopropyltriethoxysilane and N-β (aminoethyl) γ-aminopropyltrimethoxysilane; amine compounds or salts thereof such as hexylamine and dodecylamine phosphate; quaternary ammonium salts such as benzyltriethylammonium acetate; alkaline metal salts of short-chain fatty acid such as potassium acetate, sodium acetate, and lithium oxalate; dialkylhydroxylamines such as dimethylhydroxylamine and diethylhydroxylamine; and silanes and siloxanes containing a guanidyl group such as tetramethylguanidylpropyltrimethoxysilane, tetramethylguanidylpropylmethyldimethoxysilane, and tetramethylguanidylpropyltris(trimethylsiloxy)silane. The component (D) may be used alone or as a mixture of two or more of these.

The amount of the curing catalyst used may be a so-called catalytic amount. The amount of the component (D) added is preferably from 0.001 to 20 parts by mass, particularly preferably from 0.005 to 10 parts by mass, and further preferably from 0.01 to 5 parts by mass based on 100 parts by mass of the organopolysiloxane as the component (A). If the amount is smaller than 0.001 parts by mass, excellent curability cannot be obtained and therefore the curing rate decreases. If the amount is greater than 20 parts by mass, the composition cures too rapidly, leading to a potential decrease in the time period during which the applied composition is still workable and to a potential deterioration in the mechanical properties of the resulting rubber.

—Component (E)—

A component (E) is a filler (an inorganic filler and/or an organic resin filler), which is an optional component added as needed for providing sufficient mechanical strength to the cured product of the composition. The filler can be a known filler, and examples thereof include silica fine powder, fumed silica, precipitated silica, silicas having a hydrophobic surface obtained by surface treatment of these silicas with an organic silicon compound, glass beads, glass balloons, transparent resin beads, silica aerogel, diatomaceous earth, metal oxides such as iron oxide, zinc oxide, titanium oxide, and fumed metal oxides, wet silica or wet silica subjected to surface treatment with silane, quartz powder, carbon black, talc, zeolite, bentonite, and other reinforcing agents, asbestos, glass fiber, carbon fiber, metal carbonates such as calcium carbonate, magnesium carbonate, and zinc carbonate, asbestos, glass wool, fine powder mica, fused silica powder, and powders of synthetic resins such as polystyrene, polyvinyl chloride, and polypropylene. Among these, an inorganic filler such as silica, calcium carbonate, or zeolite is preferable, and fumed silica having a hydrophobic surface due to surface treatment or calcium carbonate is particularly preferable.

The amount of the component (E) added is from 0 to 1000 parts by mass, preferably from 0 to 400 parts by mass, particularly preferably from 0.1 to 200 parts by mass, and especially preferably from 0.5 to 200 parts by mass based on 100 parts by mass of the component (A). If the amount is greater than 1000 parts by mass, not only the viscosity of the resulting composition increases to impair workability, but also the cured product has low rubber-like strength and therefore is less likely to have rubber-like elasticity. Use of the component (E) can give sufficient mechanical strength to the cured product.

—Component (F)—

A component (F) is an adhesion promoter, which is an optional component added as needed for providing sufficient adhesion to the cured product of the composition. As the adhesion promoter (a silane coupling agent such as a hydrolyzable silane containing a functional group), a known adhesion promoter can be suitably used. Examples thereof include vinylsilane coupling agents, (meth)acrylic silane coupling agents, epoxysilane coupling agents, aminosilane coupling agents, and mercaptosilane coupling agents. Specific examples thereof include vinyltris(β-methoxyethoxy) silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl) γ-aminopropyltrimethoxysilane, γ-aminopropyltriethoxysilane, 3-2-(aminoethylamino)propyltrimethoxysilane, γ-mercaptopropyltrimethoxysilane, and isocyanate silane.

Among these, aminosilanes such as γ-aminopropyltriethoxysilane and 3-2-(aminoethylamino)propyltrimethoxysilane, γ-glycidoxypropyltrimethoxysilane, epoxy silanes such as β-(3,4-epoxycyclohexyl)ethyltrimethoxysilane, and isocyanate silane are particularly preferable.

The amount of the component (F) added is from 0 to 30 parts by mass, preferably from 0.1 to 30 parts by mass, and particularly preferably from 0.5 to 20 parts by mass based on 100 parts by mass of the component (A). When adhesion is achieved with the filler and the adhered without requiring any adhesion promoter, the component (F) may be omitted.

—Component (G)—

A component (G) is an organopolysiloxane, which is an optional component added as needed. The component (G) is represented by the general formula (3) below, and is a linear diorganopolysiloxane (a so-called non-functional silicone oil) having no functional group, within the molecule, that is capable of being involved with condensation reaction (in other words, the linear diorganopolysiloxane does not become involved with condensation-curing reaction of the composition).

[Chemical Formula 9]

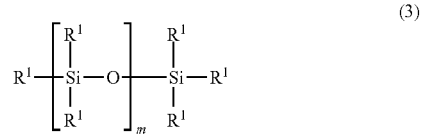

(3)

wherein $R^1$ is a hydrogen atom or an unsubstituted or substituted monovalent hydrocarbon group having 1 to 20 carbon atoms, a plurality of $R^1$ may be the same as or different from each other, and m is an integer of 1 to 2000.

The substituted or unsubstituted hydrocarbon group as $R^1$ in the general formula (3) above has 1 to 20 carbon atoms, preferably 1 to 10 carbon atoms, and more preferably 1 to 8 carbon atoms and may be the same as or different from each other. Examples thereof can include alkyl groups such as methyl group, ethyl group, n-propyl group, isopropyl group, n-butyl group, isobutyl group, tert-butyl group, pentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and eicosyl group; cycloalkyl groups such as cyclopentyl group and cyclohexyl group; alkenyl groups such as vinyl group, allyl group, propenyl group, isopropenyl group, butenyl group, pentenyl group, and hexenyl group; aryl groups such as phenyl group, tolyl group, xylyl group, and α-, β-naphthyl group; aralkyl groups such as benzyl group, 2-phenylethyl group, and 3-phenylpropyl group; and groups in which part or all of the hydrogen atoms in the group is substituted with a halogen atom such as F, Cl, or Br or with a group such as cyano group, including 3-chloropropyl group, 3,3,3-trifluoropropyl group, and 2-cyanoethyl group. Among these, methyl group and ethyl group are preferable, and in terms of availability, productivity, and cost, methyl group is particularly preferable.

The viscosity of the organopolysiloxane as the component (G) at 25° C. is preferably from 0.65 to 1,000,000 mPa·s, more preferably from 30 to 500,000 mPa·s, particularly preferably from 50 to 100,000 mPa·s, and especially preferably from 100 to 80,000 mPa·s. The viscosity of the organopolysiloxane is preferably not lower than 10 mPa·s so as to readily obtain a coating that has excellent physical and mechanical strength, and the viscosity of the organopolysiloxane is preferably not higher than 1,000,000 mPa·s so as to prevent the viscosity of the resulting composition from being too high and to give excellent workability during use. The viscosity is a numerical value measured with a rotational viscometer. m in the formula (3) above is an integer of 1 to 2000 and for the same reason as above, it is desirable that m is preferably an integer of about 10 to 1,500, an integer of about 30 to 1,200, and more preferably an integer of about 50 to 1,000.

The amount of the component (G) added is typically from 0 to 100 parts by mass, preferably from 0.1 to 80 parts by mass, more preferably from 0.5 to 75 parts by mass, further preferably from 5 to 70 parts by mass, and especially preferably from 10 to 60 parts by mass based on 100 parts by mass of the component (A). When the viscosity of the composition is low enough to achieve sufficient workability, the component (G) is not required. When the amount of the component (G) is greater than 100 parts by mass, rubber-like properties may be poor.

—Other Components—

The room-temperature-curable organopolysiloxane composition of the present invention can further comprise, as its additives, known additives including a pigment, a dye, an anti-aging agent, an antioxidant, an antistatic agent, and a flame retardant such as antimony oxide and chlorinated paraffin. In addition, the room-temperature-curable organopolysiloxane composition of the present invention can further comprise a thixotropy enhancer, such as a polyether, as well as a fungicide and an antimicrobial.

The room-temperature-curable organopolysiloxane composition of the present invention can be obtained by homogeneously mixing together the components described above and the various additives described above each in a predetermined amount in a dry atmosphere.

The room-temperature-curable organopolysiloxane composition cures while being left at room temperature. The moulding method and the curing conditions, for example, can be known method and conditions that are selected according to the kind of the composition.

The room-temperature-curable organopolysiloxane composition of the present invention thus obtained cures rapidly at room temperature upon coming into contact with moisture in the air and gives a rubber-like elastic cured product excellent in heat resistance, weather resistance, properties at low temperatures, and adhesion to various base materials, in particular, metals. The composition of the present invention is particularly excellent in storage stability and in curability and even after stored for 6 months, for example, it still cures rapidly upon exposure to the air and gives a cured product that has excellent physical properties as described above. The composition of the present invention generates no toxic gas or corrosive gas upon curing and causes no rust on the surface to which the composition is applied. The composition does not cause electrical contact failures in electrical and electronic components and, therefore, the composition is useful as an insulator and an adhesive compound for electrical and electronic components and can be widely used as a sealing agent, a coating agent, a coating agent, and a mold release agent for various base materials and also as a fiber-treatment agent. When cured and moulded, the composition can give various moulded products that are excellent in heat resistance, weather resistance, and the like.

EXAMPLES

The present invention will be described more specifically with reference to synthesis examples, examples, and comparative examples. The scope of the present invention, however, is not limited to these examples. In the specific examples below, the term "part(s)" refers to "part(s) by mass" and the viscosity is a value measured at 25° C. with a rotational viscometer.

SYNTHESIS EXAMPLES

The silicon-containing compound having 2 alkoxysilyl-vinylene groups on a single silicon atom as the component (B) is synthesized by the following method.

Synthesis Example 1

<Synthesis of Silicon-Containing Compound Having 2 Alkoxysilyl-Vinylene Groups on Single Silicon Atom, [Bis(Trimethoxysilyl-Vinylene)Dimethylsilane]>

To a 500-mL four-necked separable flask equipped with a mechanical stirrer, a thermometer, and a tap funnel, 35.0 g (0.323 mol) of diethynyldimethylsilane, 0.10 g of a 0.5-wt % toluene solution of chloroplatinate ($H_2PtCl_6 \cdot 6H_2O$), and 50 mL of toluene were added, to which 83.01 g (0.678 mol) of trimethoxysilane was added dropwise. Subsequently, the resulting mixture was stirred at 85° C. for 6 hours and distilled, and 106.2 g of a silicon compound [bis(trimethoxysilyl-vinylene)dimethyl silane] shown below was obtained (yield 90%). The resulting silicon compound was subjected to $^1$HNMR chart analysis and was confirmed to be the intended bis(trimethoxysilyl-vinylene)dimethylsilane (trans:cis=8:1) (the compound shown below). This reaction is shown by the reaction formula [3] below.

[Chemical Formula 10]

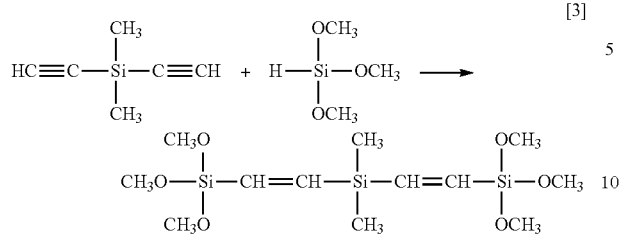

[3]

The data of the $^1$H-NMR spectrum of the compound is shown below.

$^1$H-NMR (400 MHz, C$_6$D$_6$, δ (ppm)): 0.00 (s, 6H), 3.36 (s, 18H), 6.47 (d, 2H), 7.10 (d, 2H)

Synthesis Example 2

<Synthesis of Silicon-Containing Compound Having 2 Alkoxysilyl-Vinylene Groups on Single Silicon Atom, [Bis(Trimethoxysilyl-Vinylene)Diphenylsilane]>

To a 500-mL four-necked separable flask equipped with a mechanical stirrer, a thermometer, and a tap funnel, 34.9 g (0.151 mol) of diethynyldiphenylsilane, 0.10 g of a 0.5-wt % toluene solution of chloroplatinate (H$_2$PtCl$_6$.6H$_2$O), and 50 mL of toluene were added, to which 38.5 g (0.315 mol) of trimethoxysilane was added dropwise. Subsequently, the resulting mixture was stirred at 85° C. for 6 hours and distilled, and 56.5 g of a silicon compound [bis(trimethoxysilyl-vinylene)diphenylsilane] shown below was obtained (yield 88%). The resulting silicon compound was subjected to $^1$HNMR chart analysis and was confirmed to be the intended bis(trimethoxysilyl-vinylene)diphenylsilane (trans:cis=9:1). This reaction is shown by the reaction formula [4] below.

[Chemical Formula 11]

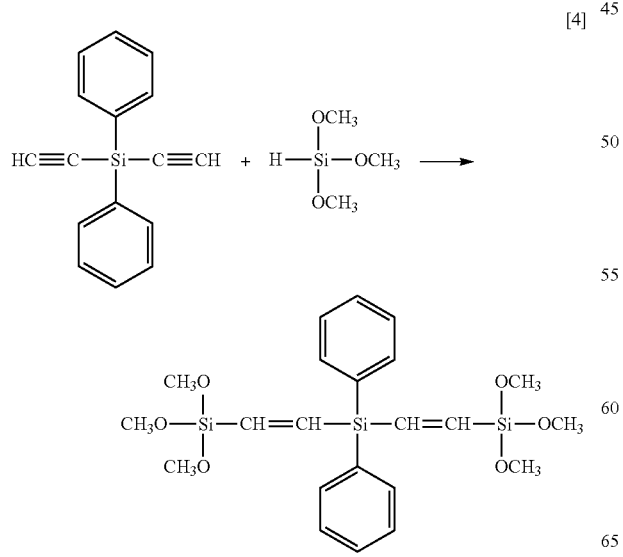

[4]

The data of the $^1$H-NMR spectrum of the compound is shown below.

$^1$H-NMR (400 MHz, C$_6$D$_6$, δ (ppm)): 3.61 (s, 18H), 6.45 (d, 2H), 7.31 (d, 2H), 7.36-7.55 (m, 10H)

Example 1

One hundred parts of dimethylpolysiloxane having a viscosity of 5000 mPa·s and having each end of the molecular chain being capped with a hydroxyl group (a silanol group), 4.9 parts of bis(trimethoxysilyl-vinylene)dimethylsilane obtained in Synthesis Example 1, and 0.75 part of tetramethylguanidylpropyltrimethoxysilane were mixed together homogeneously under shielding moisture. Thus, a composition was prepared.

Example 2

One hundred parts of dimethylpolysiloxane having a viscosity of 5000 mPa·s and having each end of the molecular chain being capped with a hydroxyl group (a silanol group), 4.9 parts of bis(trimethoxysilyl-vinylene)dimethylsilane obtained in Synthesis Example 1, and 1.0 part of an aluminum chelate compound that had the average structure represented by the structural formula (2) below, which is mono(dipivaloylmethane)aluminum bis(ethylacetoacetate) chelate, were mixed together homogeneously under shielding moisture. Thus, a composition was prepared.

[Chemical Formula 12]

Structural Formula (2)

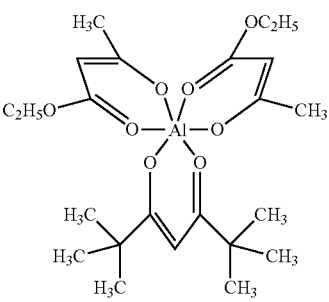

Example 3

One hundred parts of dimethylpolysiloxane having a viscosity of 5000 mPa·s and having each end of the molecular chain being capped with a hydroxyl group (a silanol group), 4.9 parts of bis(trimethoxysilyl-vinylene)dimethylsilane obtained in Synthesis Example 1, and 0.2 parts of the compound represented by the structural formula (3) below, which is N,N,N',N',N'',N''-hexamethyl-N'''-(trimethylsilylmethyl)-phosphoramidic triamide, were mixed together homogeneously under shielding moisture. Thus, a composition was prepared.

[Chemical Formula 13]

Structural Formula (3)

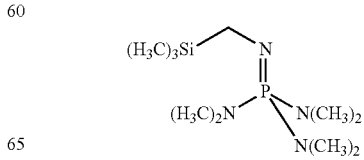

Example 4

A composition was prepared in the same manner as in Example 1 except that 6.6 parts of bis(trimethoxysilyl-vinylene)diphenylsilane obtained in Synthesis Example 2 was used instead of the bis(trimethoxysilyl-vinylene)dimethylsilane.

Comparative Examples 1 to 3

Compositions were prepared in the same manner as in Examples 1 to 3 except that 4.1 parts of vinyltrimethoxysilane [the silicon compound represented by the structural formula (4) below] was used instead of the bis(trimethoxysilyl-vinylene)dimethylsilane.

[Chemical Formula 14]

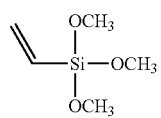

Structural Formula (4)

Comparative Examples 4 to 6

Compositions were prepared in the same manner as in Examples 1 to 3 except that 3.8 parts of methyltrimethoxysilane [the silicon compound represented by the structural formula (5) below] was used instead of the bis(trimethoxysilyl-vinylene)dimethylsilane.

[Chemical Formula 15]

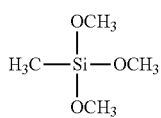

Structural Formula (5)

Comparative Example 7

A composition was prepared in the same manner as in Example 1 except that 4.5 parts of 1,6-bis(trimethoxysilyl)hexane [the silicon compound represented by the structural formula (6) below] was used instead of the bis(trimethoxysilyl-vinylene)dimethylsilane.

[Chemical Formula 16]

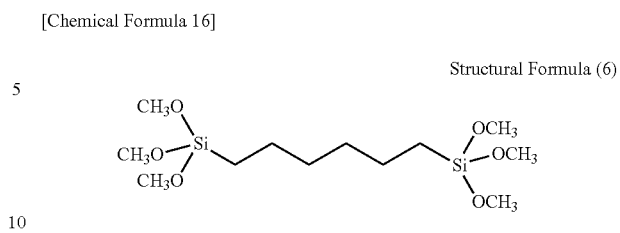

Structural Formula (6)

[Measurement of Tack Free Time]

The compositions prepared in Examples 1 to 4 and Comparative Examples 1 to 7 were subjected to measurement of tack free time.

Besides, the compositions prepared in Examples 1 to 4 and Comparative Examples 1 to 7 immediately after preparation were each extruded into a sheet with a thickness of 2 mm. The resulting sheet was exposed to the air at 23±2° C. and 50±5% RH, followed by being left in the same atmosphere for 7 days. The resulting cured product was subjected to measurement of physical properties (initial physical properties) in conformity with JIS K-6249. Hardness was measured with a Durometer A, which is a hardness tester in conformity with JIS K-6249.

The same measurement was conducted for the cured product after stored for 7 days in a thermo-hygrostat at 85° C. and 85% RH. The same measurement was also conducted for the cured product after heated for 10 days in an oven at 150° C.

Hereinafter, Table 1 shows the results of Examples 1 and 4 and Comparative Examples 1, 4, and 7; Table 2 shows the results of Example 2 and Comparative Examples 2 and 5; and Table 3 shows the results of Example 3 and Comparative Examples 3 and 6.

TABLE 1

|  | Measurement results | Ex. 1 | Ex. 4 | Comp. Ex. 1 | Comp. Ex. 4 | Comp. Ex. 7 |
|---|---|---|---|---|---|---|
|  | Tack free time (minute) | 5 | 3 | 60< | 60< | 60< |
| Initial | Hardness (Durometer A) | 22 | 25 | 16 | 6 | 24 |
| RTV | Elongation (%) | 105 | 130 | 110 | 235 | 0.33 |
| 7 days | Tensile strength (MPa) | 0.45 | 0.52 | 0.27 | 0.19 | 100 |
| Humidity | Hardness (Durometer A) | 10 | 16 | 4 | 1 | 8 |
| resistance | Elongation (%) | 155 | 165 | 430 | 365 | 120 |
| 85° C./85% RH 7 days | Tensile strength (MPa) | 0.25 | 0.27 | 0.22 | 0.08 | 0.15 |
| Heat resistance | Hardness (Durometer A) | 20 | 20 | 15 | 12 | 23 |
| 150° C. | Elongation (%) | 140 | 130 | 105 | 100 | 120 |
| 10 days | Tensile strength (MPa) | 0.47 | 0.35 | 0.23 | 0.22 | 0.29 |

TABLE 2

|  | Measurement results | Ex. 2 | Comp. Ex. 2 | Comp. Ex. 5 |
|---|---|---|---|---|
|  | Tack free time (minute) | 2 | 10 | 15< |
| Initial | Hardness (Durometer A) | 12 | 4 | 0 |

TABLE 2-continued

| Measurement results | | Ex. 2 | Comp. Ex. 2 | Comp. Ex. 5 |
|---|---|---|---|---|
| RTV | Elongation (%) | 105 | 210 | 430 |
| 7 days | Tensile strength (MPa) | 0.27 | 0.15 | 0.13 |
| Humidity | Hardness (Durometer A) | 11 | 0.5 | 0 |
| resistance | Elongation (%) | 150 | 375 | 530 |
| 85° C./85% RH 7 days | Tensile strength (MPa) | 0.33 | 0.16 | 0.13 |
| Heat resistance | Hardness (Durometer A) | 18 | 15 | 14 |
| 150° C. | Elongation (%) | 125 | 190 | 215 |
| 10 days | Tensile strength (MPa) | 0.45 | 0.38 | 0.38 |

TABLE 3

| Measurement results | | Ex. 3 | Comp. Ex. 3 | Comp. Ex. 6 |
|---|---|---|---|---|
| Tack free time (minute) | | 4 | 60< | 60< |
| Initial | Hardness (Durometer A) | 25 | 16 | 8 |
| RTV | Elongation (%) | 100 | 105 | 215 |
| 7 days | Tensile strength (MPa) | 0.46 | 0.29 | 0.22 |
| Humidity | Hardness (Durometer A) | 15 | 10 | 6 |
| resistance | Elongation (%) | 135 | 165 | 260 |
| 85° C./85% RH 7 days | Tensile strength (MPa) | 0.33 | 0.26 | 0.25 |
| Heat resistance | Hardness (Durometer A) | 26 | 18 | 10 |
| 150° C. | Elongation (%) | 115 | 135 | 100 |
| 10 days | Tensile strength (MPa) | 0.51 | 0.31 | 0.16 |

As shown above, the room-temperature-curable organopolysiloxane composition cures rapidly and gives a cured product excellent in durability.

Example 5

One hundred parts of dimethylpolysiloxane having a viscosity of 20000 mPa·s and having each end of the molecular chain being capped with a hydroxyl group (a silanol group), 13 parts of fumed silica having a hydrophobic surface due to surface treatment, 8.0 parts of bis(trimethoxysilyl-vinylene)dimethylsilane obtained in Synthesis Example 1, 0.58 parts of tetramethylguanidylpropyltrimethoxysilane, 0.8 parts of 3-aminopropyltriethoxysilane, and 0.8 parts of 3-(2-aminoethylaminopropyl)trimethoxysilane were mixed together homogeneously under shielding moisture. Thus, a composition was prepared.

Example 6

One hundred parts of dimethylpolysiloxane having a viscosity of 20000 mPa·s and having each end of the molecular chain being capped with a hydroxyl group (a silanol group), 13 parts of fumed silica having a hydrophobic surface due to surface treatment, 6.0 parts of bis(trimethoxysilyl-vinylene)dimethylsilane obtained in Synthesis Example 1, 0.58 parts of tetramethylguanidylpropyltrimethoxysilane, 0.8 parts of 3-aminopropyltriethoxysilane, and 0.8 parts of 3-(2-aminoethylaminopropyl)trimethoxysilane were mixed together homogeneously under shielding moisture. Thus, a composition was prepared.

Example 7

One hundred parts of dimethylpolysiloxane having a viscosity of 20000 mPa·s and having each end of the molecular chain being capped with a hydroxyl group (a silanol group), 10 parts of dimethylpolysiloxane having a viscosity of 100 mPa·s and having an end of the molecular chain being capped with a trimethylsilyl group, 13 parts of fumed silica having a hydrophobic surface due to surface treatment, 7.5 parts of bis(trimethoxysilyl-vinylene)dimethylsilane obtained in Synthesis Example 1, 0.58 parts of tetramethylguanidylpropyltrimethoxysilane, 0.8 parts of 3-aminopropyltriethoxysilane, and 0.8 parts of 3-(2-aminoethylaminopropyl)trimethoxysilane were mixed together homogeneously under shielding moisture. Thus, a composition was prepared.

The compositions prepared in Examples 5 to 7 were subjected to measurement of tack free time.

Besides, the composition prepared in Reference Example 5 immediately after preparation was extruded into a sheet with a thickness of 2 mm. The resulting sheet was exposed to the air at 23° C. and 50% RH, followed by being left in the same atmosphere for 7 days. The resulting cured product was subjected to measurement of physical properties (initial physical properties) in conformity with JIS K-6249. Hardness was measured with a Durometer A, which is a hardness tester in conformity with JIS K-6249.

The same measurement was conducted for the cured product after being stored for 7 days in a thermo-hygrostat at 85° C. and 85% RH. The same measurement was also conducted for the cured product after being heated for 10 days in an oven at 150° C.

Table 4 shows the results of Examples 5 to 7.

TABLE 4

| Measurement results | | Ex. 5 | Ex. 6 | Ex. 7 |
|---|---|---|---|---|
| Tack free time (minute) | | 3 | 3 | 5 |
| Initial | Hardness (Durometer A) | 45 | 45 | 41 |
| RTV | Elongation (%) | 180 | 160 | 170 |
| 7 days | Tensile strength (MPa) | 2.22 | 1.95 | 1.62 |
| Humidity | Hardness (Durometer A) | 40 | 40 | 39 |
| resistance | Elongation (%) | 175 | 190 | 170 |
| 85° C./85% RH 7 days | Tensile strength (MPa) | 1.71 | 1.42 | 1.26 |
| Heat resistance | Hardness (Durometer A) | 48 | 44 | 44 |
| 150° C. | Elongation (%) | 165 | 175 | 165 |
| 10 days | Tensile strength (MPa) | 2.12 | 1.88 | 1.99 |

As shown above, the room-temperature-curable organopolysiloxane composition of the present invention cures rapidly and gives a cured product excellent in durability.

The scope of the present invention is not limited to these embodiments. These embodiments are merely illustrative. Anything that has substantially the same configuration as the configuration of the technical idea described in the claims of the present invention and has a similar effect is subsumed within the technical scope of the present invention.

The invention claimed is:

1. A room-temperature-curable organopolysiloxane composition, comprising components (A), (B), and (D):
   (A) an organopolysiloxane represented by formula (1):

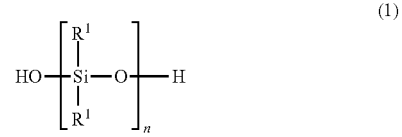

(1)

wherein $R^1$ in formula (1) is a hydrogen atom or an unsubstituted or substituted monovalent hydrocarbon group having 1 to 20 carbon atoms, a plurality of $R^1$ may be the same as or different from each other, and n is an integer of 1 or greater;

(B) an organic silicon compound represented by formula (2) containing 2 silyl-vinylene groups on a single silicon atom, an amount of the component (B) being from 0.1 to 30 parts by mass based on 100 parts by mass of the component (A):

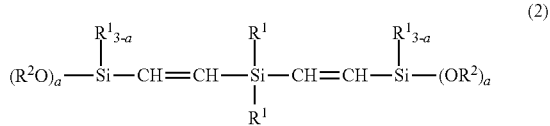
(2)

wherein $R^1$ in formula (2) is a hydrogen atom or an unsubstituted or substituted monovalent hydrocarbon group having 1 to 20 carbon atoms, a plurality of $R^1$ may be the same as or different from each other, $R^2$ is an unsubstituted or substituted alkyl group having 1 to 20 carbon atoms or an unsubstituted or substituted cycloalkyl group having 3 to 20 carbon atoms, and a is an integer of 1 to 3; and (D) a curing catalyst, an amount of the component (D) being from 0.001 to 20 parts by mass based on 100 parts by mass of the component (A).

2. The room-temperature-curable organopolysiloxane composition according to claim 1, further comprising (C) a hydrolyzable silane and/or a partial hydrolysis-condensation product thereof except for the component (B), an amount of the component (C) being from 0.1 to 30 parts by mass based on 100 parts by mass of the component (A).

3. The room-temperature-curable organopolysiloxane composition according to claim 1, further comprising (E) a filler, an amount of the component (E) being from 0.1 to 1000 parts by mass based on 100 parts by mass of the component (A).

4. The room-temperature-curable organopolysiloxane composition according to claim 1, further comprising (F) an adhesion promoter, an amount of the component (F) being from 0.1 to 30 parts by mass based on 100 parts by mass of the component (A).

5. The room-temperature-curable organopolysiloxane composition according to claim 1, further comprising (G) an organopolysiloxane represented by formula (3), an amount of the component (G) being from 0.1 to 100 parts by mass based on 100 parts by mass of the component (A):

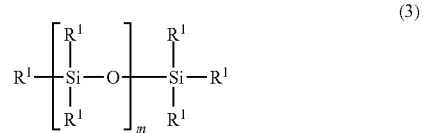
(3)

wherein $R^1$ in formula (3) is a hydrogen atom or an unsubstituted or substituted monovalent hydrocarbon group having 1 to 20 carbon atoms, a plurality of $R^1$ may be the same as or different from each other, and m is an integer of 1 to 2000.

6. A sealing agent, a coating agent, or an adhesive agent, comprising the room-temperature-curable organopolysiloxane composition according to claim 1.

7. A moulded product comprising a cured product of the room-temperature-curable organopolysiloxane composition according to claim 1.

* * * * *